United States Patent [19]

Steinberg et al.

[11] 4,020,003
[45] Apr. 26, 1977

[54] FIXATION OF TRITIUM IN A HIGHLY STABLE POLYMER FORM

[75] Inventors: Meyer Steinberg, Huntington Station; Peter Colombo, Patchogue; Jacob Pruzansky, E. Islip, all of N.Y.

[73] Assignee: The United States of America as represented by the United States Energy Research and Development Administration, Washington, D.C.

[22] Filed: Feb. 24, 1976

[21] Appl. No.: 660,909

[52] U.S. Cl. .................................... 252/301.1 W
[51] Int. Cl.² .......................................... G21F 9/16
[58] Field of Search ........... 252/301.1 W; 526/285, 526/75

[56] References Cited

OTHER PUBLICATIONS

BNL 18648, Steinberg, M. et al., "Tritium Concentration and Fixation," Feb. 1974.
"Acetylene Producer Cuts Costs," Chem. and Eng. News, vol. 36, No. 2, pp. 49–51, (Feb. 10, 1958).

Primary Examiner—Benjamin R. Padgett
Assistant Examiner—Deborah L. Kyle
Attorney, Agent, or Firm—Dean E. Carlson; Leonard Belkin

[57] ABSTRACT

A method for the fixation of tritium comprising reacting tritiated water with calcium carbide to produce calcium hydroxide and tritiated acetylene, polymerizing the acetylene, and then incorporating the polymer in a solidifying matrix.

2 Claims, No Drawings

FIXATION OF TRITIUM IN A HIGHLY STABLE POLYMER FORM

BACKGROUND OF THE INVENTION

This invention was made in the course of, or under a contract with the United States Energy Research and Development Administration, or its predecessor the United States Atomic Energy Commission.

Tritium with a half-life of 12.36 years and characterized by beta decay with an 18.6 KeV maximum energy has been considered one of the most innocuous of fission produced radionuclides. Along with $^{59}$Ni and $^{55}$Fe, it has a maximum permissible body burden of 1 mc, the highest value listed in the recommendations of the International Commission on Radiological Protection. Because of the low energy and penetration power of the beta particle associated with its decay, tritium does not pose a significant external radiation hazard. However, tritiated water and its vapor can be taken into the body by skin penetration. The retention of tritium in the body is dependent on the chemical form in which it enters. Thymidine, a specific precursor of deoxyribonucleic acid (DNA) is incorporated preferentially in the nuclei of cells. The probability of genetic and somatic damage from tritium exposure is enhanced when tritium is ingested as tritiated thymidine.

The natural abundance of tritium is exceedingly small, and has been estimated as approximately 1 tritium atom per $10^{17}$ hydrogen atoms in ordinary water. Other major sources of tritium are nuclear weapons testing, nuclear power plants, and nuclear fuel reprocessing operations. The natural annual tritium production has been assessed as 4 to 8 megacuries which would give rise to a steady-state tritium inventory of 70 to 140 megacuries. On the basis of present projections, the rate of production of fission-produced tritium would begin to exceed the rate of natural tritium production by about 1990. The development of thermonuclear power, while rather remote in the near future, is expected to significantly increase tritium inventories and management problems. The amount of tritium produced in thermonuclear reactions is several orders of magnitude higher than the amount of tritium produced by an equivalent quantity of fission energy.

It can presently be argued that on a global scale tritium production poses no problems. An inventory of 100 megacuries could be dissolved in the top 75 meters of the world's oceans to give a concentration of $3.7 \times 10^{-10}$ $\mu$Ci/ml. This is significantly less than the present maximum permissible concentration of $3 \times 10^{-3}$ $\mu$Ci/ml. However, local tritium concentrations may become problematic. A major fraction of the fission-produced tritium will be released during fuel reprocessing and there is a strong economic incentive to increase the size of other plants as the nuclear industry expands. A 10 ton/day reprocessing plant may have to dispose of 6,000 Ci/day requiring $2 \times 10^9$ liters of water per day to dilute to the mpc level.

Present methods for fixing tritiated water include a solidification process involving ureaformaldehyde (UF) or a cement process. Solidification by the former process may result in the presence of unreacted acidic catalyst which may attack the container. The latter produces a product which is porous so that the final product must be kept dry to avoid leaching.

SUMMARY OF THE PRESENT INVENTION

The present invention provides for the permanent storage of tritiated water in solid form which is virtually free of leaching when in contact with water.

In accordance with a preferred embodiment of this invention, tritiated water is reacted with calcium carbide to produce calcium hydroxide and acetylene, separating the final products, and polymerizing the acetylene. To improve the yield of the process, the calcium hydroxide may be calcinated to remove the tritiated water and the water-calcium carbide reaction is repeated.

It is thus a principal object of this invention to provide for the fixation of tritiated water in such form as to minimize leachability.

Other objects and advantages of this invention will hereinafter become obvious from the following description of preferred embodiments of this invention.

DESCRIPTION OF THE PREFERRED EMBODIMENTS

Tritium fixation by incorporation into a polymeric form results in both low leachability and tritium exchange rates due to the nature of the strong hydrogen-carbon covalent bond. The system in accordance with the principles of this invention is the polymerization of acetylene produced by the reaction of tritiated water with calcium carbide.

By tritiated water (i.e., H$_2$O-tritiated) herein is meant ordinary water containing T$_2$O where T is tritium in amounts in excess of that found in nature.

Tritiated water is concentrated in respect to tritium by isotopic separation or by any other method as is known in the art. This allows the dispersion of a large quantity of very low activity water to the enviroment and the required fixation of a small quantity of relatively high activity tritiated water. It also allows the recovery of deuterium for tritiated heavy water wastes from certain types of fission reactors. The concentrated tritium waste is converted to tritiated acetylene by reaction with calcium carbide, in accordance with the following reaction:

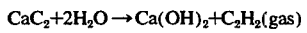

$$CaC_2 + 2H_2O \rightarrow Ca(OH)_2 + C_2H_2(\text{gas})$$

The tritiated acetylene is then polymerized to form polyacetylene which is then incorporated into a water-cement mix to provide a massive monolithic encapsulation.

The reaction of tritiated water with calcium carbide partitions only one-half of the initial tritium as tritiated acetylene, the remainder is contained in tritiated calcium hydroxide. Tritiated water can be removed from this calcium hydroxide by calcination at 350-400° C and recycled to the tritiated water-calcium carbide reaction. If desired, on the other hand, the tritiated calcium hydroxide can be directly incorporated into cement with the tritiated polyacetylene produced.

Polymerization of the acetylene gas can be accomplished either by exposure to $^{60}$Co gamma radiation or the use of a catalyst.

Polymerization by gamma radiation may be accomplished by exposing a vessel containing acetylene maintained under pressure to gamma rays. As the acetylene is polymerized and collects as a powder, more gas enters the vessel due to a reduction in pressure. An example of this follows:

EXAMPLE I

A. Tritiated acetylene gas was produced by the reaction of 6.0 grams of tritiated water (1.0 Ci/ml) with 12.0 grams of calcium carbide (calcium carbide in excess) as shown in Equation (1).

$$CaC_2 + \text{tritiated } 2H_2O \rightarrow \text{tritiated } C_2H_2 + \text{tritiated } Ca(OH)_2 \quad (1)$$

B. Tritiated acetylene was introduced into an evacuated 1250 cm³ glass reaction vessel to a total acetylene pressure of 1374 mm Hg absolute.

C. The reaction vessel was placed in a $^{60}Co$ gamma source with an intensity of $1.8\times10^6$ rad/hr.

D. $G(-C_2H_2)$ initial = 147 molecules/100eV. With water present in the reaction vessel, $G(-C_2H_2)$ initial = 168 molecules/100eV.

E. The polyacetylene produced was in the form of a yellow powder which on SEM examination was found to have a spherical morphology with a particle diameter ranging from approximately 1.0–2.0μ. This powder was determined to be inert, non-volatile, insoluble and thermally stable to approximately 325° C. The bulk leach rate for tritium release was $1.8\times10^{-8}$ g/(cm²-day).

Polymerization by catalyst may be effected by passing the acetylene gas over a suitable catalyst such as copper oxide. Typically, the reaction vessel could consist of a glass tube into which the catalyst is placed and a chromel-alumel thermocouple is inserted. The thermocouple would act to control the current flowing through the elements of a clamshell furnace in which the reaction vessel is placed and thus the reaction temperature desired. Gas flow would be determined by a rotometer placed in-line between the gas sources and the reaction vessel. Since the gas flow is determined, the amount of acetylene flowing into the reaction vessel is known. Gas flowing through the reaction vessel without reacting flows through a bubbler submersed in acetone, which is used to remove acetylene and also prevents the back flow of air into the system. Prior to the initiation of the reaction, the system is purged with nitrogen to remove residual oxygen and air. The production of tritiated acetylene gas from tritiated water can be accomplished by use of an acetylene gas generator.

The following is an example of the polymerization by catalyst:

EXAMPLE II

A. Tritiated acetylene gas was produced in a commercial acetylene generator by the addition of tritiated water (1.0μCi/ml) to calcium carbide.

B. A glass reaction vessel was used which supported the catalyst bed on a copper mesh screen. A thermocouple was inserted into the catalyst bed allowing thermostatic temperature control by a clamshell furnace placed around the reaction vessel.

C. Tritiated acetylene gas was allowed to flow for five hours at 50cm³/min. over a 30.0 gram cupric oxide catalyst bed heated to 260° C.

D. The polyacetylene produced was in the form of a brown powder which had a contorted cylindrical morphology. The powder was determined to be inert, insoluble, non-volatile and thermally stable to approximately 325° C. An entrained copper content was evident.

After the acetylene is polymerized by any of the methods described above, the powdered $C_2H_2$ can then be mixed with water and cement or any other solidifying matrix and then cured into hardened form, thereby immobilizing the fixed tritiated polyacetylene.

EXAMPLE III

Incorporation of tritiated polyacetylene in a hydraulic cement matrix:

a. In one case, 28 grams of water were added to 100 grams of portland type II cement giving a workable mix. To this mix, 85 grams of tritiated polyacetylene were added by stirring. The concrete was allowed to cure. b. In another case, tritiated polyacetylene was compressed to form pellets which were incorporated as aggregate into a hydraulic cement mix. Tritiated polyacetylene was compressed in a die to produce pellets with a density of 0.7 g/cm³. 28 grams of water were added to 100 grams of portland type II cement giving a workable mix. 120 grams of tritiated polyacetylene pellets were added to this mix under stirring action. The concrete was allowed to cure.

EXAMPLE IV

Incorporation of tritiated polyacetylene in polystyrene: 75 grams of tritiated polyacetylene were stirred into 100 grams of styrene monomer containing 0.5 wt.% benzoyl peroxide. The mixture was then heated for several hours at 50° C to polymerize the styrene.

EXAMPLE V

Impregnation of tritiated polyacetylene pellets: Tritiated polyacetylene pellets with a density of 0.7 g/cm³ were formed under compression. A one gram tritiated polyacetylene pellet soaked in styrene monomer containing 0.5 wt.% benzoyl peroxide absorbs 0.4 grams of monomer. The styrene soaked pellet was heated at 50° C for one hour to polymerize the styrene.

What is claimed is:
1. A method of fixing tritiated water comprising the steps of:
   a. reacting said tritiated water and calcium carbide to produce tritiated calcium hydroxide and acetylene;
   b. separating the calcium hydroxide from the acetylene;
   c. polymerizing the acetylene to form polyacetylene; and
   d. incorporating the polyacetylene in a solidfying matrix of cement and water.
2. The method of claim 1 in which the tritiated calcium hydroxide is calcinated to remove the tritiated water therefrom followed by repeating the water-calcium carbide reaction to increase the yield of tritiated acetylene.

* * * * *